US007219104B2

(12) United States Patent
Lang et al.

(10) Patent No.: US 7,219,104 B2
(45) Date of Patent: May 15, 2007

(54) DATA CLEANSING

(75) Inventors: Stefan Dieter Lang, Oftersheim (DE); Willi Alexander Rausch, Kraichtal (DE)

(73) Assignee: SAP Aktiengesellschaft, Walldorf (DE)

(*) Notice: Subject to any disclaimer, the term of this patent is extended or adjusted under 35 U.S.C. 154(b) by 119 days.

(21) Appl. No.: 10/133,633

(22) Filed: Apr. 29, 2002

(65) Prior Publication Data

US 2003/0204518 A1 Oct. 30, 2003

(51) Int. Cl.
*G06F 7/00* (2006.01)
*G06F 17/30* (2006.01)

(52) U.S. Cl. ............... 707/102; 707/100; 707/103 R; 707/104.1; 707/10

(58) Field of Classification Search ......... 707/1–104.1; 705/7, 10
See application file for complete search history.

(56) References Cited

U.S. PATENT DOCUMENTS

| 5,838,965 | A | * | 11/1998 | Kavanagh et al. ....... 707/103 R |
| 5,940,830 | A | * | 8/1999 | Ochitani .................. 707/10 |
| 5,970,490 | A | * | 10/1999 | Morgenstern ............. 707/10 |
| 6,035,300 | A | | 3/2000 | Cason et al. |
| 6,167,405 | A | * | 12/2000 | Rosensteel et al. ....... 707/102 |
| 6,208,990 | B1 | * | 3/2001 | Suresh et al. ............ 707/6 |
| 6,324,492 | B1 | * | 11/2001 | Rowe ..................... 709/203 |
| 6,324,541 | B1 | | 11/2001 | de l'Etraz et al. |
| 6,363,393 | B1 | | 3/2002 | Ribitzky |
| 6,381,601 | B1 | * | 4/2002 | Fujiwara et al. ......... 707/7 |
| 6,523,019 | B1 | * | 2/2003 | Borthwick .............. 706/45 |
| 6,604,110 | B1 | * | 8/2003 | Savage et al. ........... 707/102 |
| 6,735,593 | B1 | * | 5/2004 | Williams ................ 707/102 |
| 6,748,402 | B1 | * | 6/2004 | Reeves et al. ........... 707/201 |
| 6,836,773 | B2 | * | 12/2004 | Tamayo et al. .......... 705/10 |
| 2002/0083067 | A1 | * | 6/2002 | Tamayo et al. .......... 707/100 |
| 2002/0133504 | A1 | * | 9/2002 | Vlahos et al. .......... 707/104.1 |
| 2002/0184213 | A1 | * | 12/2002 | Lau et al. .............. 707/6 |
| 2003/0018605 | A1 | * | 1/2003 | Policastro et al. ....... 707/1 |
| 2003/0061212 | A1 | * | 3/2003 | Smith et al. ............ 707/6 |
| 2003/0130878 | A1 | * | 7/2003 | Kruk et al. ............. 705/7 |
| 2003/0130991 | A1 | * | 7/2003 | Reijerse et al. ......... 707/3 |
| 2003/0144938 | A1 | * | 7/2003 | Lahre et al. ............ 705/36 |
| 2003/0167253 | A1 | * | 9/2003 | Meinig ................... 707/1 |
| 2003/0212984 | A1 | * | 11/2003 | Miyazaki et al. ........ 717/116 |
| 2003/0225770 | A1 | * | 12/2003 | Lang et al. ............. 707/100 |

(Continued)

OTHER PUBLICATIONS

Georgakopoulos D. et al.; "An Overview of Workflow Management: From Process Modeling to Workflow Automation Infrastructure"; Distributed and Parallel Databases, Kluwer, NL, vol. 3, No. 2, pp. 119-153; (Apr. 1995).
"Oracle Warehouse Builder: A Technical Overview"; A Oracle Technical White Paper, pp. 1-21; (Feb. 2000).

(Continued)

*Primary Examiner*—John Breene
*Assistant Examiner*—Anh Ly
(74) *Attorney, Agent, or Firm*—Fish & Richardson P.C.

(57) ABSTRACT

Data cleansing of a data management system involves merging two data objects by copying one or more attribute values associated with one a source object to a target data object and reassigning any instances that refer to the source object to the target object. The source object may be deleted. A user interface is developed that allows a user to select from a list of possible source objects and target objects, view attribute values for an object, view dependent relationships as dependency trees, indicate any attribute values that should be copied and any referring objects that should be reassigned to the target instance.

24 Claims, 6 Drawing Sheets

U.S. PATENT DOCUMENTS

2003/0233365 A1* 12/2003 Schmit et al. ............... 707/100
2004/0133551 A1*  7/2004 Linstedt ......................... 707/1

OTHER PUBLICATIONS

Rahm E. et al.; "Data Cleaning: Problems and Current Approaches"; Quarterly Bulletin of the Computer Society of the IEEE Technical Committee on Data Engineering, Washington, DC; pp. 1-11; (Dec. 2000).

Whalen, D. et al.; "Linking Client Records from Substance Abuse, Mental Health and Medicated State Agencies"; Internet Citation, pp. 1-46; (Jul. 2001).

Garcia, M. et al.; "Immunization Registries DeDuplication and Record Matching"; A White Paper: Immunization Registries DeDuplication and Record Matching; pp. 1-11; (1999).

* cited by examiner

DATA CLEANSING

TECHNICAL FIELD

This description relates to techniques for data management.

BACKGROUND

A database, such as relational database or an object-oriented database, or an other type of data management system may be used for the administration of data processed by a computer system running one or more application programs. Some data in the data management system may be incorrect because data is duplicated in the data management system. Data may be duplicated when two or more identical records exist in the data management system, when two or more records that represent the same entity exist in a data management system in which only one record for a particular entity is permitted, or when two records exist that incorrectly represent the same entity or event even when the records are not identical and more than one record for a particular entity or event is permitted. Duplicated data or incorrect data may be removed from the data management system to improve the accuracy of the data stored.

SUMMARY

In one general aspect, when data is maintained, a target instance of a data element and a source instance of a data element having one or more associated attribute values are displayed. An indication is received that identifies one or more attribute values associated with the source instance that are to be associated with the target instance. The identified attribute values then are associated with the target instance.

Implementations may include one or more of the following features. For example, a source identification key for the source instance and a target identification key for the target instance may be received. The source identification key may be used to access source data structure information identifying one or more data elements relating to the source instance and one or more attribute values associated with the source instance. The target identification key may be used to access target data structure information identifying one or more data elements relating to the target instance and one or more attribute values associated with the target instance. The source data structure information may differ from the target data structure information.

The source instance may be deleted. When the source instance is deleted, the source instance may be physically deleted by removing the source instance from storage holding the source instance. Alternatively, the source instance may be logically deleted by indicating the source instance is to be removed at a later time from storage holding the source instance.

The source instance may be archived, or an indication may be made that the source instance is to be archived at a later time.

An indication as to whether an attribute value associated with the source instance is identical to a corresponding attribute value associated with the target instance may be displayed.

When a source instance has one or more subcomponents and each subcomponent has one or more associated attribute values, a subcomponent of the source instance may be displayed. An indication that the displayed subcomponent of the source instance is to be associated with the target instance may be received, and the identified subcomponent may be associated with the target instance. When a target instance also has one or more subcomponents and each subcomponent has one or more associated attribute values, at least one attribute value associated with the subcomponent of the source instance and at least one attribute value associated with the subcomponent of the target instance are displayed. An indication that identifies at least one attribute value associated with the subcomponent of the source instance that is to be associated with the subcomponent of the target instance may be received. The identified attribute values may be associated with the subcomponent of the target instance.

A target list may be associated with at least one source instance and at least one target instance. Identifying information for each source instance and each target instance associated with the target list may be displayed. An indication may be received that identifies a source instance and a target instance to be displayed. An indication that identifies one or more subcomponents associated with the source instance that are to be removed from the display may be received, and the identified subcomponents may be removed from the display.

In another general aspect, when data is maintained, instances of data elements, with each instance having one or more associated attribute values and an associated identification key, may be received. The identification key associated with each instance may be displayed. An indication that identifies one of the displayed identification keys as the identification key of a source instance and another one of the displayed identification keys as a target instance may be received. The target instance, the source instance, and one or more associated attribute values may be displayed. An indication that identifies one or more attribute values associated with the source instance that are to be associated with the target instance may be received. The identified attribute values may be associated with the target instance. A source dependency tree showing one or more subcomponents associated with the source instance may be displayed. Similarly, a target dependency tree showing one or more subcomponents associated with the target instance may be displayed. A dependency indication that identifies one or more subcomponents associated with the source instance that are to be associated with the target instance may be received, and the identified subcomponents may be associated with the target instance.

Implementations of the techniques discussed above may include a method or process, or computer software on a computer-accessible medium.

The details of one or more of the implementations are set forth in the accompanying drawings and description below. Other features and advantages will be apparent from the descriptions and drawings, and from the claims.

DESCRIPTION OF THE DRAWINGS

Like reference symbols in the various drawings indicate like elements.

DETAILED DESCRIPTION

Figure 1:
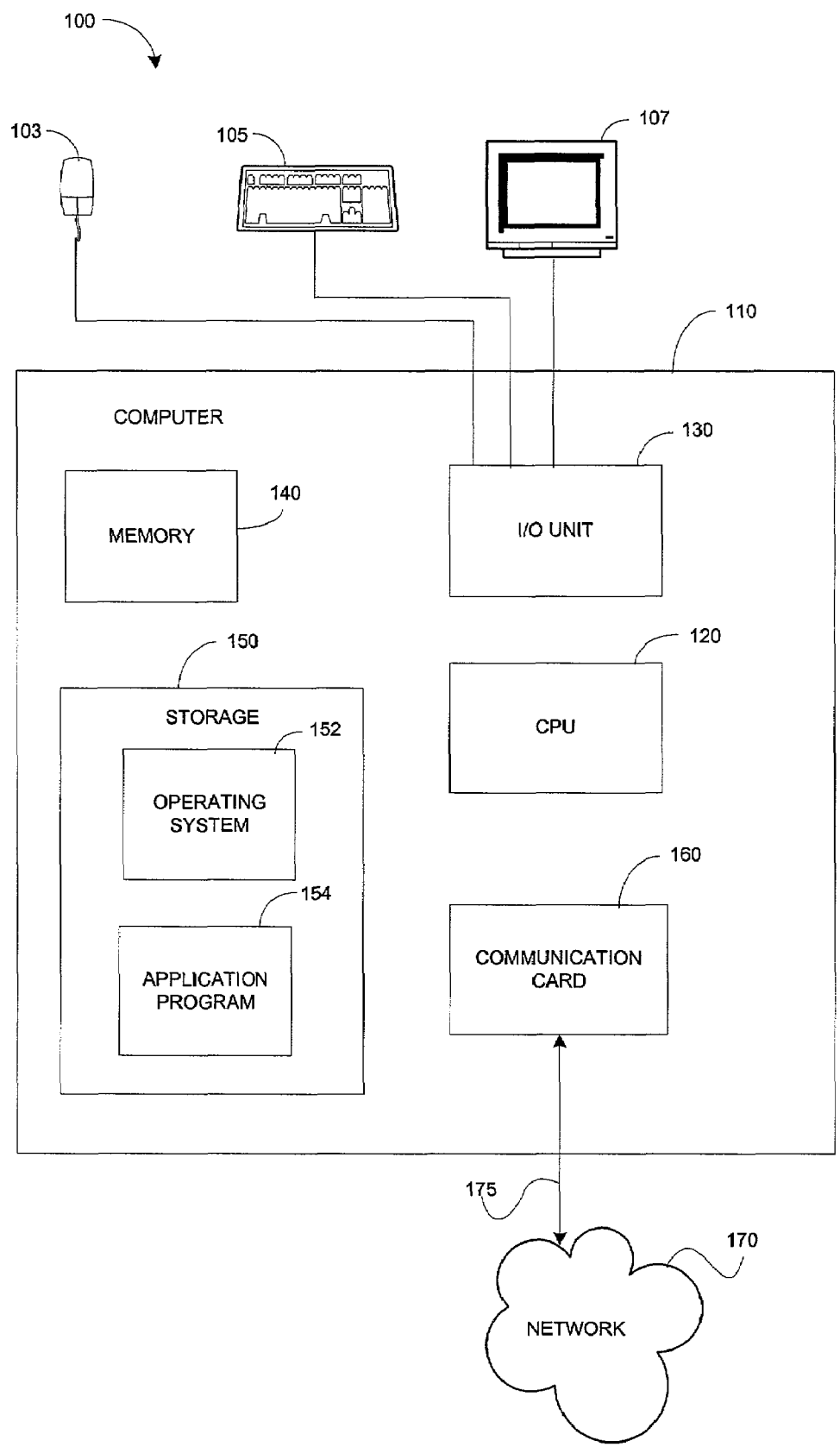
FIG. 1 is a block diagram of a programmable system for data cleansing.

Referring to FIG. 1, a programmable system 100 that performs data cleansing includes a variety of input/output (I/O) devices (e.g., mouse 103, keyboard 105, and display 107) and a computer 110 having a central processor unit (CPU) 120, an I/O unit 130, a memory 140, and a data storage device 150. Data storage device 150 may store machine-executable instructions, data, and various programs such as an operating system 152 and one or more application programs 154 for data cleansing, all of which may be processed by CPU 120. Each computer program may be implemented in a high-level procedural or object-oriented programming language, or in assembly or machine language if desired. The language may be a compiled or interpreted language. Data storage device 150 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM).

System 100 also may include a communications card or device 160 (e.g., a modem and/or a network adapter) for exchanging data with a network 170 using a communications link 175 (e.g., a telephone line, a wireless network link, a wired network link, or a cable network). Other examples of system 100 may include a handheld device, a workstation, a server, a device, a component, other equipment, or some combination of these capable of responding to and executing instructions in a defined manner. Any of the foregoing may be supplemented by, or incorporated in, ASICs (application-specific integrated circuits).

Figure 2:
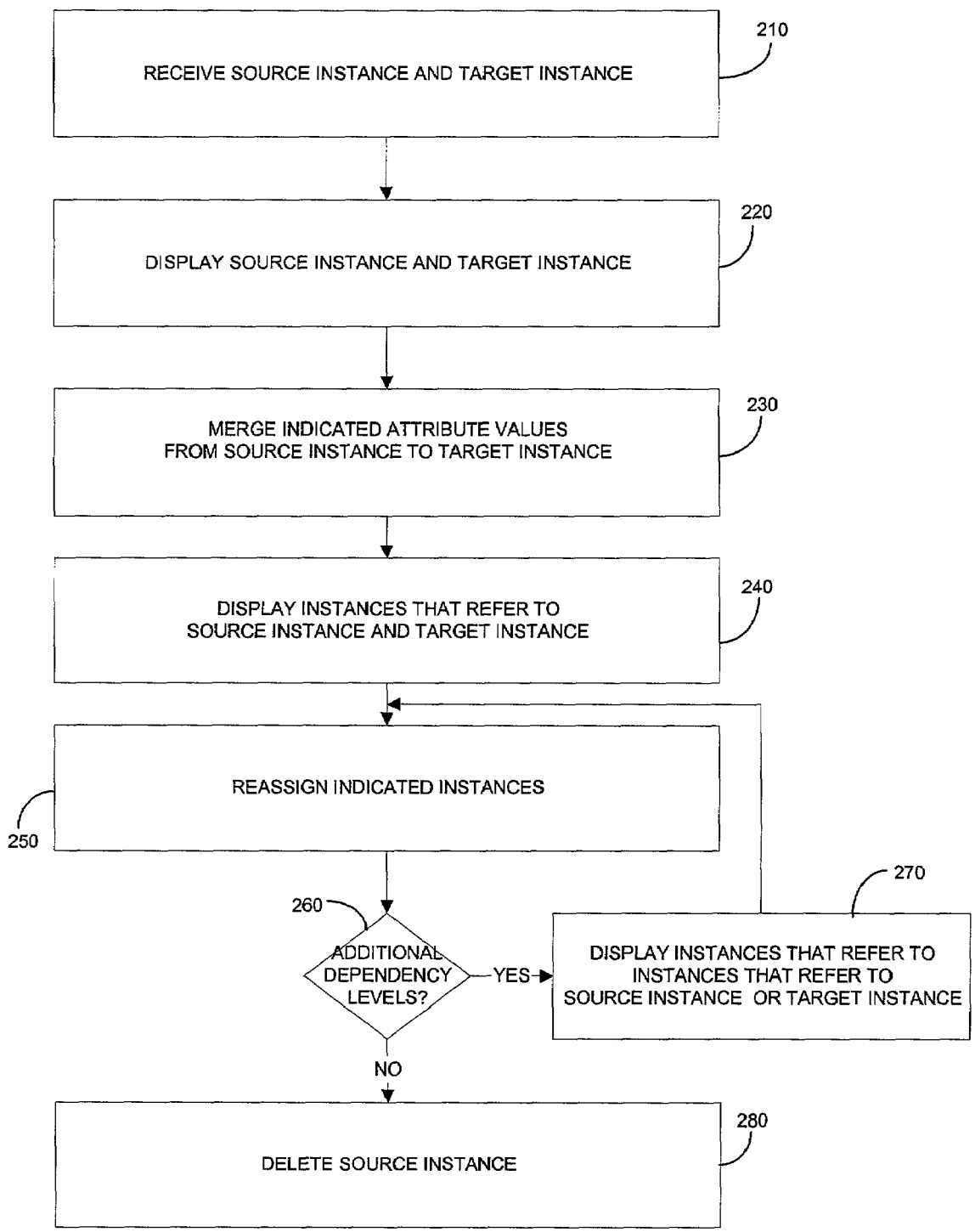
FIG. 2 is a flow chart of a data cleansing process.

Referring to FIG. 2, data stored that is duplicated or otherwise incorrect may require correction (which may be referred to as cleansing). Data that requires cleansing may be stored in an object-oriented database system that logically or physically organizes data into a series of objects (which may be referred to as an object-oriented database), a relational database, or another type of data management system. Each object may be associated with a series of attributes, and each instance of an object may be associated with a series of attribute values.

Data that requires cleansing also may be stored in a relational database system that may logically organize data into a series of database tables. A database table may arrange data associated with an entity in a series of columns and rows. Each column may describe an attribute of the entity for which data is being stored. Each row may represent a collection of attribute values for a particular entity.

Some systems may use a relational database system to store object data that may require cleansing. Data may be stored physically in one or more relational database tables and organized logically as a series of objects. Typically, a relational database table may be used to store data belonging to a particular object class, and each row in the relational database table may represent an object instance.

Data that requires cleansing also may be stored in a type of data management system that may not use a relational or object database. For example, a series of XML (Extensible Mark-up Language) documents may be used. XML is a language similar to hypertext markup language (HTML) but with the additional flexibility of being able to describe data structures that can be processed directly as data by a program.

FIGS. 2–6, for illustrative purposes, describe data involved in data cleansing as being objects. The benefits of data cleansing are not limited to that particular implementation, and are equally applicable to implementations involving other types of data management systems, such as relational database systems and XML-based systems.

FIG. 2 shows a data cleansing process 200. Data cleansing involves merging two objects (each of which may be stored as one or more records, rows, or objects) to correct data in a database, for example, by eliminating duplicate data. The objects involved in data cleansing may be considered duplicates of one another when the objects represent the same entity even when the attributes of the involved objects are not the same. Data cleansing may also be referred to as data clearing or data reconciliation.

Typically, the objects involved are two instances that are duplicates of a master object class in a database. A master object class may be an object class that represents a principal entity, such as an employee, a customer, a business partner, or a product. A master object class may have a series of attributes and may be related to one or more object classes that refer to the master object class. An object that refers to another object may be called a referring object or a dependent object. For example, an instance of employee master object class may be associated with a series of attributes (such as first name, last name, and employee identification number) and may be related to two instances of a phone number referring object class (that each are associated with a particular phone number) and an instance of a work address referring object class (that is associated with address attribute values, such as street address, city, state, zip code, and country).

The cleansing process 200 begins when a processor receives a source instance and a target instance (step 210). The process 200 deletes the source instance, may copy indicated attributes from the source instance to the target instance (which may be referred to as merging), and may reassign one or more indicated instances that refer to the source instance to refer to the target instance. The source instance and the target instance may be collectively referred to as a cleansing case, a source-target pair, or a source-target set.

The processor generates a user interface that displays the source instance and the target instance (step 220). The processor may display the source instance and the target instance in a display that allows the user to see the attribute values of each instance at the same time (which may be referred to as a split-screen display).

Using the interface, the user indicates which, if any, attribute values of the source instance are to be copied to the target instance. The processor then copies the indicated attribute values from the source instance to the target instance (step 230). This may be referred to as merging attribute values.

When the source object is associated with one or more referring object instances, the processor generates a user interface that displays one or more referring instances for the source instance and one or more referring object instances that exist for the target instance (step 240). Using the interface, the user indicates which, if any, source referring instances should be reassigned to the target instance.

The processor then reassigns the indicated referring instances from the source instance to the target instance (step 250). To do so, the processor creates a new target referring instance, copies the attribute values from the source referring instance to the new target referring instance, and deletes the source referring instance. Some implementations may reassign each indicated source referring instance in another manner, such as by modifying each source referring instance to relate to the target instance and, thus, become a target referring instance.

The processor determines whether an additional dependency level of referring instances exist for the source instance (e.g., when an instance refers to an instance that refers to the source instance) (step 260). If so, the processor displays one or more of the instances that refers to a referring instance for the source instance (step 270). The processor also may display one or more instances that refer to a referring instance for the target instance that corresponds to the displayed object type. The processor then proceeds as previously described.

If the processor determines that no additional levels of referring instances exist (step 260), the processor deletes the source instance (step 280). Some implementations may permit an instance to be modified or deleted only under particular conditions. For example, the processor may prohibit an order for merchandise from being deleted after an order has been placed. Such data integrity rules may be stored in the database system or as processing logic (or business rules) in an application program.

Figure 3:
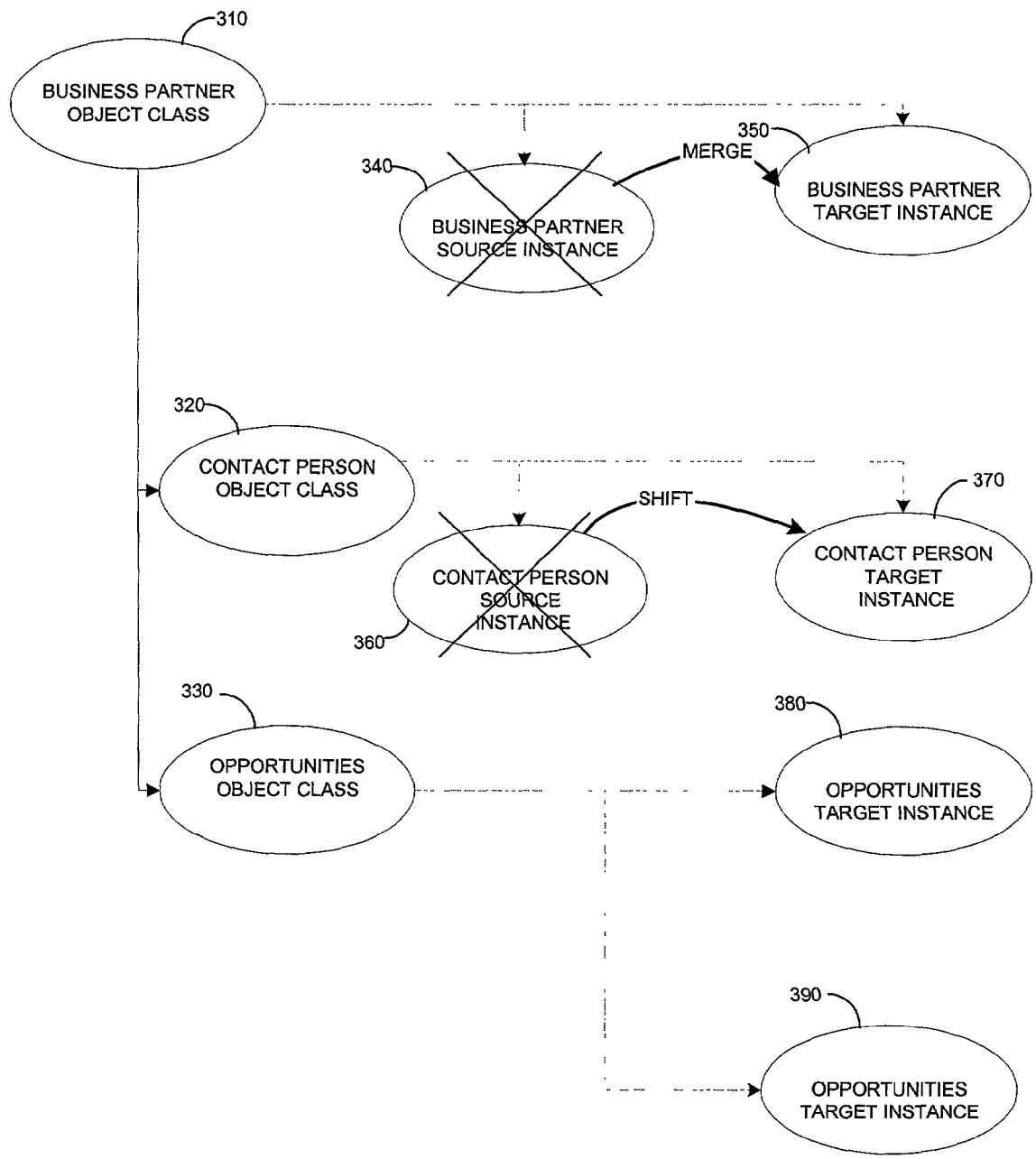
FIG. 3 is a block diagram illustrating the results of data cleansing.

FIG. 3 shows the results 300 of a data cleansing process for a business partner object class 310. The business partner object class 310 is related to contact person object class 320 and an opportunities object class 330.

Source instance 340 and target instance 350 are each instances of the business partner object class. As shown, one or more of the attribute values from source instance 340 have been merged into target instance 350, and source instance 340 has been deleted.

Contact person source instance 360 was reassigned from source instance 340 to target instance 350. In particular, contact person target instance 370 was created by copying the attributes from contact person target instance 360, and contact person source instance 360 was deleted.

No instances of the opportunities object class 330 referred to source instance 340. Opportunities target instances 380 and 390 refer to target instance 350 and, accordingly, were not modified during the cleansing process.

Figure 4:
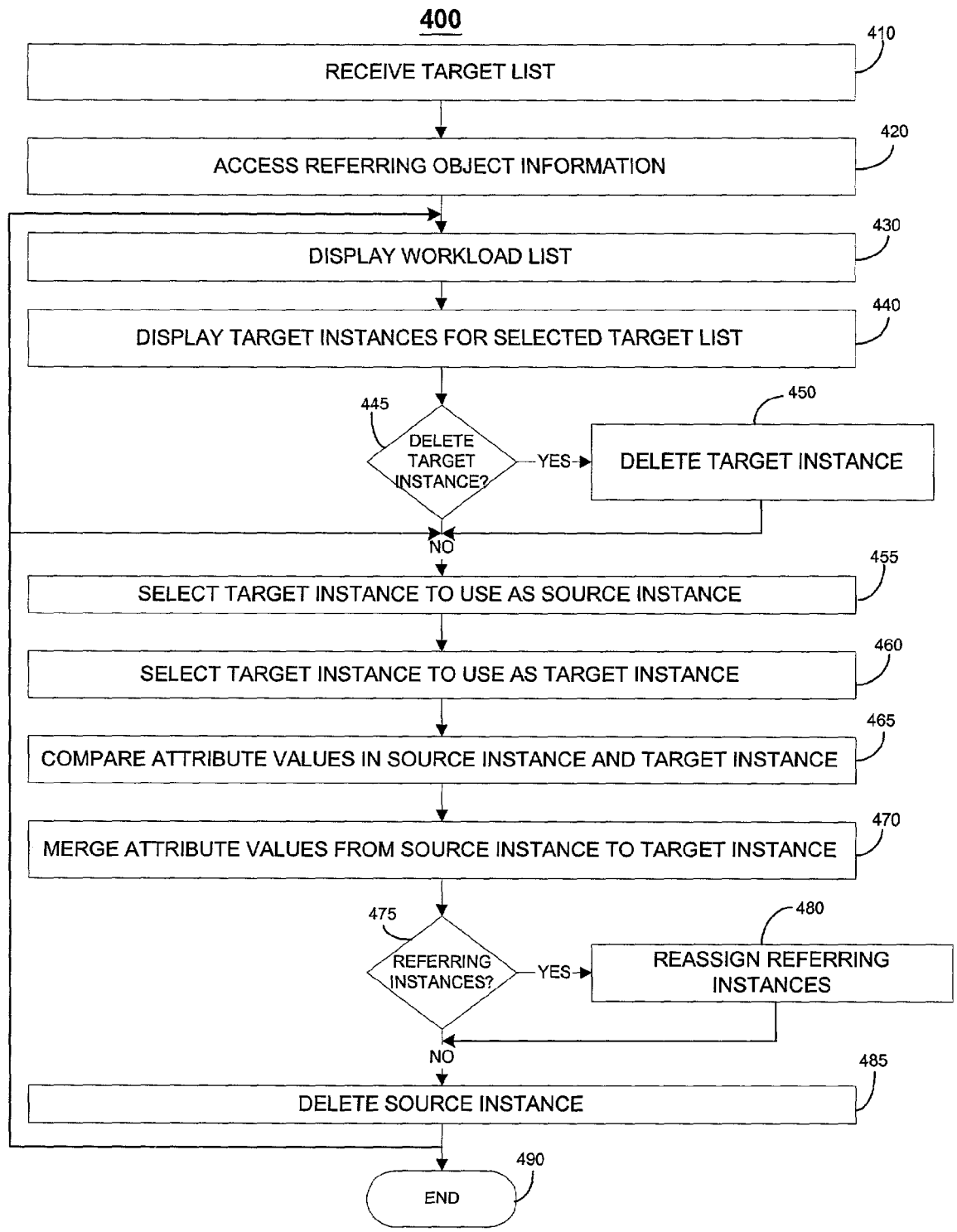
FIG. 4 is a flow chart of a data cleansing process.

FIG. 4 illustrates a process 400 that is a more specific example of a process for data cleansing. In a typical implementation, a message is received that identifies at least two master object instances that are hypothesized to be duplicate master records (step 410). The message may be referred to as a hypothesis message, the set of master object instances that are hypothesized to be duplicates may be referred to as a target list, and each master object instance may be referred to as a target instance. Unlike in the data cleansing process 200, none of the target instances on the target list are identified in the hypothesis message as a source instance. One hypothesis message may include more than one target list. The duplicate master object instances may have been identified during an online transaction process, during a data exchange process, or by a process that searches for duplicates or closely related records in a database. The received message may be formatted as an XML document, one or more entries for a database table, an email message, a binary file, or a text file.

Some implementations may include attribute values for each target instance in the target list or may indicate the status of each target instance in the target list (with the status being, for example, identified as a duplicate, rejected as a duplicate, or processed). Some implementations may determine whether two target instances have identical attribute values, and, if so, identify them as duplicates and prohibit a user from indicating later that the target instances are not duplicates.

For each target instance included in the target list, the processor accesses referring object information that identifies one or more instances of dependent objects that refer to the target instance (step 420). To do so, the processor accesses a referring object electronic spreadsheet (such as one created using a version of Excel available from Microsoft Corporation) that indicates a key identifier for the target instance, text that identifies the target instance, and a key identifier (which may be referred to as a relationship key) and an object class name for each dependent object instance that refers to the target instance. The referring object electronic spreadsheet has a column for the target instance key identifier, a column for a key identifier for a dependent object instance, and a column for an object class name for a dependent object instance. The referring object electronic spreadsheet has a row for each instance that refers to a target instance in the target list. Other information (such as whether an instance may be deleted) may be stored in the referring object electronic spreadsheet. The referring object electronic spreadsheet may be received as part of the hypothesis message or received separately.

Some implementations may use other techniques for identifying instances that refer to a target instance in the target list. For example, a database table or data model repository may be accessed for referring object information. Some implementations may include attributes and attribute values as part of the referring object information.

The processor displays a list of target lists received as a workload list (that may be referred to as a cleansing stack) to permit a user to select a target list (step 430). For each target list, the workload list may include an identification number for the target list, the object class of the target instances to be cleared (e.g., table name or table reference number), an indicator of the status of the target list (e.g., in process, new, rejected, known duplicate), a priority rating (e.g., high, normal, low), the date and time that the target list was added to the workload list, an indication of the user who is responsible for cleansing this target list, and a description of the object class to be cleared. When the processor displays the target list in the workload list, the processor initiates a background process to determine any instances that refer to a target instance included in a target list.

When the user selects a target list, the processor then displays a list of the key identifiers for each target instance associated with the target list identified from the workload list (step 440). The display includes a source instance navigational area and a target instance navigational area. A navigational area may be referred to as a window.

In general, the user reviews the target instances (such as by reviewing attribute values of a target instance and any instance that refers to the target instance) to determine whether any target instance is a duplicate instance and, if so, which target instance is to be deleted. The user may base this decision on, for example, the relative quality of the data values in each instance, the relative quantity of dependent instances for a target instance, or whether a target has an instance that cannot be deleted. In some implementations, the user may be able to display additional information about one or more target instances listed, such as a probability value that reflects the likelihood that a pair of target instances are duplicates. The probability value may be based on the degree of identical fields found in the target instances.

The user may indicate that one or more target instances are not duplicates and may be rejected as data cleansing objects (step 445). If so, the processor then deletes the appropriate target objects from the workload (step 450).

The processor displays a target instance selected by the user from the target list in the source instance navigation area (step 455). The user may identify a target instance, for example, by dragging-and-dropping a key identifier from the target list to a particular navigation area. The processor displays the text that identifies the target instance and a list of the instances that refer to the target instance (which may be referred to as a dependency tree). The target instance displayed in the source instance navigation area may be referred to as the source instance for the source-target pair.

The processor displays a second target instance selected by the user from the target list in the target instance navigation area (step 460). The user may identify a target instance, for example, by dragging-and-dropping a key identifier from the target list to a particular navigation area. The processor displays the dependency tree for the target instance. The target instance displayed in the target instance navigation area may be referred to as the target instance for the source-target pair.

Some implementations may allow a user to replace the instance selected as the source instance with another instance in the target list before any attribute values are merged from the source instance to the target instance. Similarly, some implementations may allow a user to replace the instance selected as the source instance with another instance in the target list before any attribute values are merged from the source instance to the target instance.

The processor then presents a user interface that displays the attribute values for both the source object and the target object and allows the user to indicate which, if any, attribute values are to be merged from the source object to the target object (step 465). Some implementations may allow the user to drag-and-drop attribute values from the source object to the target object, highlight one or more attribute values to be copied from the source object to the target object, or check a checkbox or push a radio button to indicate which attribute values are to be copied. Some implementations may display attribute values in a different manner based on whether the source and target object attribute values are the same or different. For example, attribute values that are the same in the source instance and target instance for a particular attribute might be displayed in one color (e.g., green) and attribute values that are different in the source instance and target instance for a particular attribute might be displayed in another color (e.g., red). Some implementations may use an icon, such as an equal sign or unequal sign, to indicate whether the attribute values are the same or different in the source instance and target instance.

When the user has indicated which, if any, attribute values are to be copied from the source object to the target object, the processor copies the indicated attribute values from the source object to the target object (step 470).

When one or more referring instances exist for the source instance, the user indicates which, if any, referring instances should be reassigned to the target instance (step 475). The user may so indicate by dragging-and-dropping a portion of the dependency tree from the source instance navigation area to the target instance navigation area.

All of the referring instances that have been indicated are reassigned to the target instance (step 480). When the user indicates that a referring instance is to be reassigned to the target instance, the processor creates a new referring instance that refers to the target instance, copies the attribute values from the referring instance that referred to the source instance to the new referring instance, and deletes the referring instance that referred to the source instance.

Some implementations may reassign each indicated source instance in another manner, such as by modifying each dependent source instance to relate to the target instance. Some implementations may allow a user to indicate whether a referring instance that refers to the source instance should be deleted. Some implementations may not allow a referring instance to be deleted under some conditions.

The processor then may delete the source instance (step 485). Alternatively or additionally, the process may request that the source object be deleted or archived (or may delete the source object directly). Some implementations may physically delete the source object, logically delete the source object (e.g., indicate that the object has been deleted and make the object inaccessible until the object is physically removed from the database), indicate that the source object should be archived, and/or initiate an archiving process to remove the source object from the database.

Based on an instruction of the user, the processor displays a target instance in the source instance navigation area (step 455) and proceeds as described previously, displays a workload list (step 430) and proceeds as described previously, or ends the data cleansing process 400 (step 490).

Some implementations may automate portions of the data cleansing process after a source-target pair has been selected. For example, the processor may shift all referring objects from the source to the target object, and may add any missing attributes to the target.

The data cleansing user interface may be developed by using Reconciliation Framework, an interface generation product available from IBU Aerospace & Defense.

The processor determines a list of all instances of an object class by using the referring object spreadsheet or table. The processor determines a list of attributes of an object instance. Some implementations may only copy an instance under certain conditions, such as to ensure referential integrity or in a critical object (orders) that cannot be deleted. The processor may check to determine whether the instance can be reassigned before reassigning the instance.

Reassigning an instance may involve creating an instance for the target object and keeping the referring source object, creating an instance for the target object and deleting the referring source object, or keeping the instance as is but changing references to the referring source object.

Figure 5:
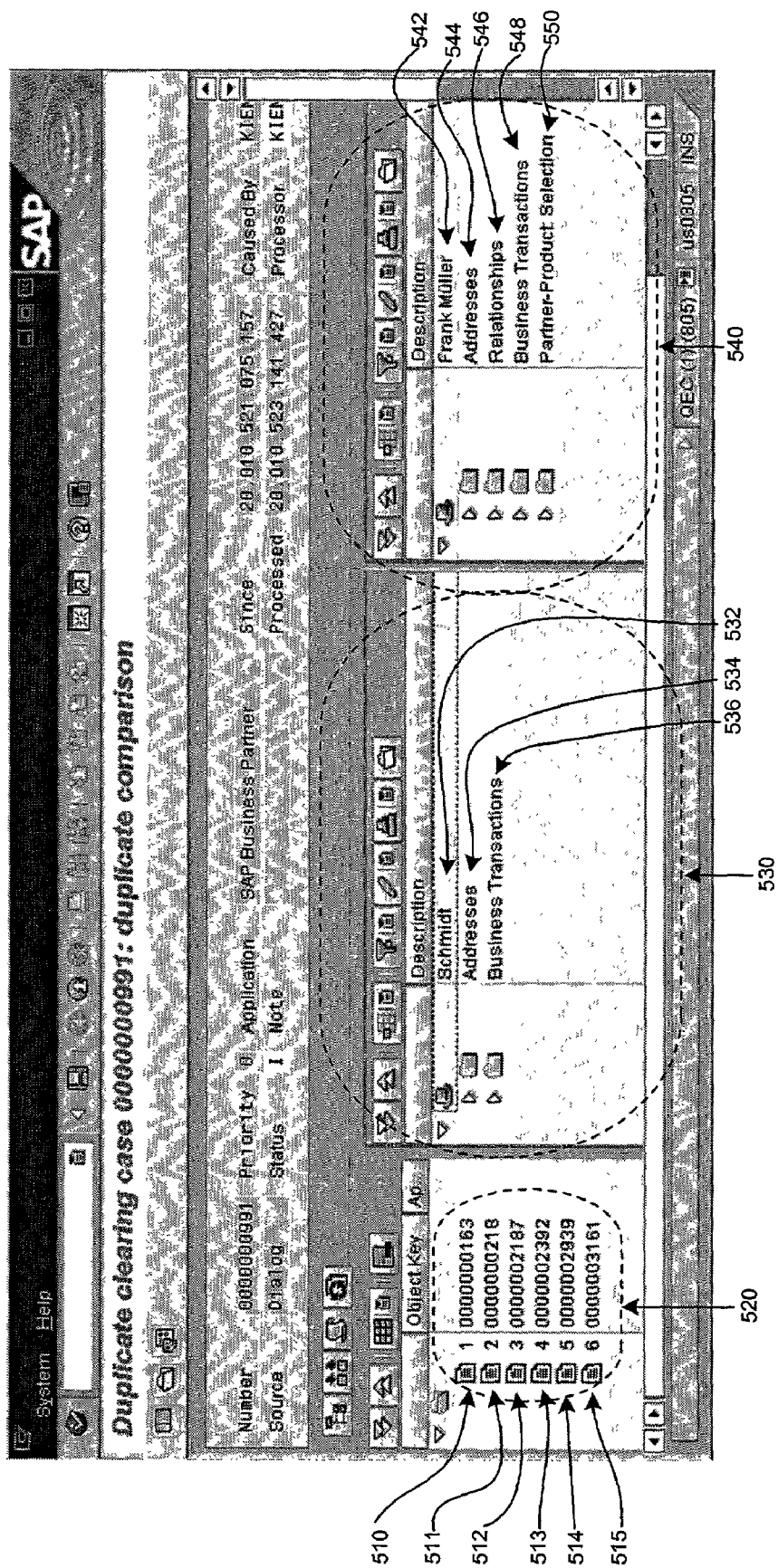
FIGS. 5 and 6 are screen captures of aspects of a data cleansing process.

FIG. 5 illustrates an exemplary list of key identifiers for target instances 510-515 of a target list 520. Source instance navigation area 530 includes the text identifying the source instance 532, an addresses object class 534 having one or more addresses instances that refer to the source instance (not shown), and a business-transactions object class 536 having one or more business-transactions instances that refer to the source instance (not shown). The text identifying the source instance 532, the addresses object class 534, and the business-transactions object class 536 collectively may be referred to as a dependency tree.

Target instance navigation area 540 includes the text identifying the target instance 542, an addresses object class 544 having one or more addresses instances that refer to the target instance (not shown), a relationships object class 546 having one or more relationships that refer to the target instance (not shown), a business-transactions object class 548 having one or more business-transaction instances that refer to the target instance (not shown), and a partner-product selection object class 550 having one or more partner-product selections that refer to the target instance (not shown).

The user may expand one or more object classes in the source instance dependency tree to show undisplayed instances or object classes. Similarly, the user may collapse a portion or all of a dependency tree that has been expanded to hide referring instances or dependent object classes.

The user may display the attribute values for an instance. The user may display the attribute values for an instance that refers to the source instance and the attribute values for an instance that refers to the target instance. The two instances displayed may be of the same object class.

The user may indicate any referring instances are to be reassigned from the source instance to the target instance by dragging-and-dropping any portion of the dependency tree to the target instance navigation area 540. For example, when the addresses object class 534 is dragged-and-dropped onto the target instance navigation area, the processor reassigns to the target instance all of the addresses instances that refer to the source instance. Similarly, when the addresses object class 534 and the business-transactions object class are dragged-and-dropped onto the target instance navigation area 540, the processor reassigns to the target instance all of the addresses instances and all of the business-transactions instances that refer to the source instance. A particular instance of an addresses object that refers to the source instance may be reassigned to the target instance by expanding the addresses object class so that the addresses instances are displayed and dragging an addresses instance to the target instance navigation area 540.

Some implementations may display and allow reassignment for one or more additional levels of dependent objects. For example, the expansion of business-transactions object class 536 may display a business-transactions-contract object class and a business-transactions-contact object class, each of which has one or more instances. An instance of a business-transactions-contact object class that refers to an instance of a business-transactions class that refers to the source instance may be reassigned to the target instance.

Figure 6:
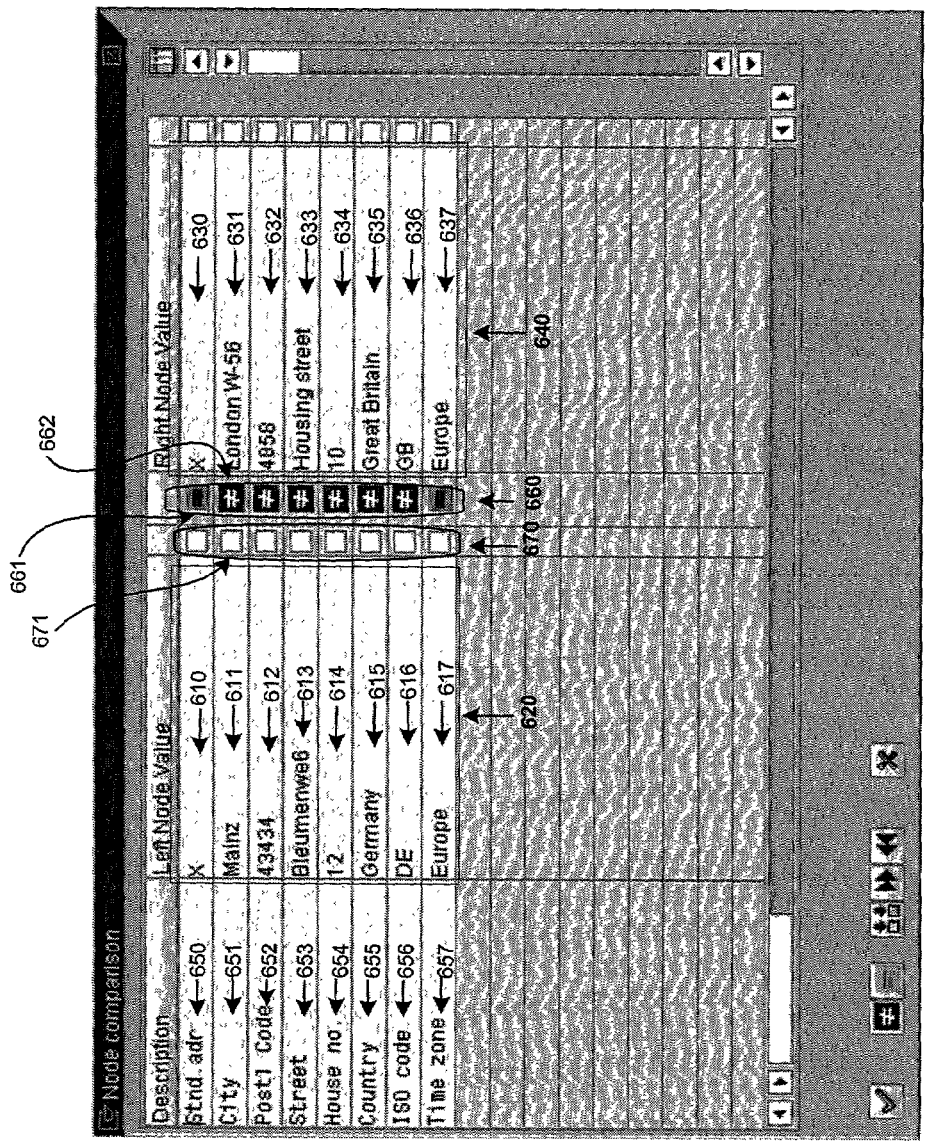

Referring to FIG. 6, attribute values 610–617 for addresses instance 620 that refers to the source instance and attribute values 630–637 for addresses instance 640 that refers to the target instance are displayed. A description 650–657 for each attribute of the object class is displayed. For example, the description "city" 651 is an attribute in the addresses object class, attribute value 611 "Mainz" is the city attribute value in the addresses instance that refers to the source instance, and the attribute value 631 "London W-56" is the city attribute value in the addresses instance that refers to the target instance. Attribute value 611 and attribute value 631 may be referred to as corresponding attribute values.

For each displayed attribute, an indication 660 is displayed as to whether the corresponding attribute values for addresses instance 620 and addresses instance 640 are equal. For example, an equal sign 661 indicates that the attribute value 610 for addresses instance 620 is the same as the attribute value 630 for addresses instance 640. Similarly, an unequal sign 662 indicates that the attribute value 611 for addresses instance 620 is not the same as the attribute value 613 for addresses instance 640.

A user may indicate that one or more particular attribute values in addresses instance 620 that refers to the source instance may be merged with addresses instance 640 that refers to the target instance by clicking in a blank square (that may represent a checkbox) in column 670 that corresponds to the attribute value to be copied from addresses instance 620 to addresses instance 640. For example, to indicate that attribute value 611 "Mainz" in addresses instance 620 should be copied to addresses instance 640, the blank checkbox 671 may be checked.

Some implementations may provide the object data values in the received message in lieu of or in addition to the object identification information.

Implementations may include a method or process, an apparatus or system, or computer software on a computer medium. It will be understood that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components.

The benefits from data cleansing using the techniques described are not limited to reducing the number of duplicate records and are equally applicable to other contexts. For example, these techniques may be used to transfer data in a dependent object instance to a new parent object that is not a duplicate of another the object, or to review data to determine the accuracy of the data (e.g., when the data has been received from an unreliable or untrustworthy source).

Other implementations are within the scope of the following claims.

What is claimed is:

1. A computer-implemented method comprising:
receiving, at one or more processors of a computer, an indication of a source instance of an object type wherein the source instance has one or more associated attribute values and is associated with one or more source referring instances, with each source referring instance having one or more associated attribute values;
receiving, at the one or more processors of the computer, an indication of a target instance of the object type, wherein the target instance i) has one or more associated attribute values, ii) corresponds to the source instance, and iii) is associated with one or more target referring instances, with each target referring instance having one or more associated attribute values;
accessing the source instance from electronic storage;
accessing the target instance from electronic storage;
displaying, on a display device of the computer, at least one attribute value of a source referring instance;
displaying, on the display device, at least one attribute value of a target referring instance, the displayed target referring instance corresponding to the displayed source referring instance;
receiving user input that identifies at least one attribute value associated with the displayed source referring instance that is to be associated with the displayed target referring instance; and
storing, in electronic storage, the identified at least one attribute value in association with the displayed target referring instance that is associated with the target instance.

2. The method of claim 1 wherein:
receiving, at one or more processors of a computer, an indication of a source instance of an object type comprises receiving a source identification key for the source instance;
receiving, at the one or more processors of the computer, an indication of a target instance of the object type comprises receiving a target identification key for the target instance;

accessing the source instance from electronic storage comprises using the source identification key to access source data structure information identifying one or more data elements relating to the source instance and one or more attribute values associated with the source instance; and accessing the target instance from electronic storage comprises using the target identification key to access target data structure information identifying one or more data elements relating to the target instance and one or more attribute values associated with the target instance.

3. The method of claim 2 wherein the source data structure information differs from the target data structure information.

4. The method of claim 1 further comprising deleting the source instance.

5. The method of claim 4 wherein deleting the source instance comprises physically deleting the source instance by removing the source instance from electronic storage.

6. The method of claim 4 wherein deleting the source instance comprises logically deleting the source instance by indicating the source instance is to be removed at a later time from electronic storage.

7. The method of c aim 1 further comprising archiving the source instance.

8. The method of claim 1 further comprising indicating that the source instance is to be archived at a later time.

9. The method of claim 1 further comprising displaying an indication as to whether the at least one attribute value of the source referring instance is identical to the at least one attribute value of the target referring instance.

10. The method of claim 1 wherein:
receiving, at one or more processors of a computer, an indication of a source instance of an object type and receiving, at the one or more processors of the computer, an indication of a target instance of the object type comprises:
associating a target list with at least one source instance and at least one target instance;
displaying identifying information for each source instance and each target instance associated with the target list; and
receiving an indication that identifies a source instance and a target instance to be displayed.

11. The method of claim 1 further comprising:
receiving an indication that identifies at least one attribute value of the source referring instance that is to be removed from the display device, and
removing the identified at least one attribute value of the source referring instance from the display device.

12. A computer-implemented method comprising:
receiving instances of data elements, with each instance having one or more associated attribute values and an associated identification key;
displaying the identification key associated with each instance;
receiving a user-selected indication that identifies one of the displayed identification keys as the identification key of a source instance;
receiving a user-selected indication that identifies one of the displayed identification keys as the identification key of a target instance;
displaying the source instance and one or more associated attribute values;
displaying the target instance;
displaying a source dependency tree showing one or more source referring instances associated with the source instance;
displaying a target dependency tree showing one or more target referring instances associated with the target instance;
displaying at least one attribute value associated with at least one of the displayed source referring instances of the source instance and at least one attribute value associated with at least one of the displayed target referring instances of the target instance;
receiving user input that identifies at least one attribute value associated with at least one of the displayed source referring instances of the source instance that is to be associated with a displayed target referring instance of the target instance; and
associating the identified attribute values with the displayed target referring instance of the target instance.

13. A system comprising a processor connected to a storage device and one or more input/output devices, wherein the processor is executed to:
receive, at one or more processors of a computer, an indication of a source instance of an object type wherein the source instance has one or more associated attribute values and is associated with one or more source referring instances, with each source referring instance having one or more associated attribute values;
receive, at the one or more processors of the computer, an indication of a target instance of the object type, wherein the target instance i) has one or more associated attribute values, ii) corresponds to the source instance, and iii) is associated with one or more target referring instances, with each target referring instance having one or more associated attribute values;
access the source instance from electronic storage;
access the target instance from electronic storage;
display, on a display device of the computer, at least one attribute value of a source referring instance;
display, on the display device, at least one attribute value of a target referring instance, the displayed target referring instance corresponding to the displayed source referring instance;
receive user input that identifies at least one attribute value associated with the displayed source referring instance that is to be associated with the displayed target referring instance; and
store, in electronic storage, the identified at least one attribute value in association with the displayed target referring instance that is associated with the target instance.

14. The system of claim 13 wherein
a processor executed to receive, at one or more processors of a computer, an indication of a source instance of an object type comprises a processor executed to receive a source identification key for the source instance;
a processor executed to receive, at the one or more processors of the computer, an indication of a target instance of the object type comprises a processor executed to receive a target identification key for the target instance;
a processor executed to access the source instance from electronic storage comprises a processor executed to use the source identification key to access source data structure information identifying one or more data elements relating to the source instance and one or more attribute values associated with the source instance; and a processor executed to access the target instance from electronic storage comprises a processor executed to use the target identification key to access target data structure information identifying one or more data elements relating to the target instance and one or more attribute values associated with the target instance.

15. The system of claim 14 wherein the source data structure information differs from the target data structure information.

16. The system of claim 13 wherein the processor is further executed to delete the source instance.

17. The system of claim 16 wherein deleting the source instance comprises physically deleting the source instance by removing the source instance from electronic storage.

18. The system of claim 16 wherein deleting the source instance comprises logically deleting the source instance by indicating the source instance is to be removed at a later time from electronic storage.

19. The system of claim 13 wherein the processor is further executed to archive the source instance.

20. The system of claim 13 wherein the processor is further executed to indicate that the source instance is to be archived at a later time.

21. The system of claim 13 wherein the processor is further executed to display an indication as to whether the at least one attribute value of the source referring instance is identical to the at least one attribute value the target referring instance.

22. The system of claim 13 wherein a processor executed to receive, at one or more processors of a computer, an indication of a source instance of an object type and receive, at the one or more processors of the computer, an indication of a target instance of the object type comprises a processor executed to:
- associate a target list with at least one source instance and at least one target instance;
- display identifying information for each source instance and each target instance associated with the target list; and
- receive an indication that identifies a source instance and a target instance to be displayed.

23. The system of claim 13 wherein the processor is further executed to:
- receive an indication that identifies at least one attribute value of the source referring instance that is to be removed from the display device; and
- remove the identified at least one attribute value of the source referring instance from the display device.

24. A system comprising a processor connected to a storage device and one or more input/output devices, wherein the processor is executed to:
- receive instances of data elements, with each instance having one or more associated attribute values and an associated identification key;
- display the identification key associated with each instance;
- receive a user-selected indication that identifies one of the displayed identification keys as the identification key of a source instance;
- receive a user-selected indication that identifies one of the displayed identification keys as the identification key of a target instance;
- display the source instance and one or more associated attribute values;
- display the target instance;
- receive a user-selected indication that identifies one or more attribute values associated with the source instance that we to be associated with the target instance;
- associate the identified attribute values with the target instance;
- display a source dependency tree showing one or more source referring instances associated with the source instance;
- display a target dependency tree showing one or more target referring instances associated with the target instance;
- display at least one attribute value associated with at least one of the displayed source referring instances of the source instance and at least one attribute value associated with at least one of the displayed target referring instances of the target instance;
- receive user input that identifies at least one attribute value associated with at least one of the displayed source referring instances of the source instance that is to be associated with a displayed target referring instance of the target instance; and
- associate the identified attribute values with the displayed target referring instance of the target instance.

* * * * *

UNITED STATES PATENT AND TRADEMARK OFFICE
CERTIFICATE OF CORRECTION

PATENT NO. : 7,219,104 B2 Page 1 of 1
APPLICATION NO. : 10/133633
DATED : May 15, 2007
INVENTOR(S) : Stefan Dieter Schreck et al.

It is certified that error appears in the above-identified patent and that said Letters Patent is hereby corrected as shown below:

Title Page
Please correct: "(75) Inventors: Stefan Dieter Lang" to --(75) Inventors: Stefan Dieter Schreck--

Signed and Sealed this

Nineteenth Day of February, 2008

JON W. DUDAS
*Director of the United States Patent and Trademark Office*